(12) United States Patent
Attarzadeh et al.

(10) Patent No.: US 11,624,386 B2
(45) Date of Patent: Apr. 11, 2023

(54) TOLERANCE COMPENSATION DEVICE FOR FLAT COMPONENTS

(71) Applicant: Auto-Kabel Management GmbH, Hausen i.W. (DE)

(72) Inventors: Amir Hossein Attarzadeh, Mönchengladbach (DE); Franz-Heinz Kaszubowski, Wassenberg (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/583,974

(22) Filed: Jan. 25, 2022

(65) Prior Publication Data

US 2022/0145916 A1 May 12, 2022

Related U.S. Application Data

(63) Continuation of application No. 16/959,479, filed as application No. PCT/EP2018/085017 on Dec. 14, 2018, now abandoned.

(30) Foreign Application Priority Data

Mar. 19, 2018 (DE) .................... 10 2018 106 312.1

(51) Int. Cl.
*F16B 5/02* (2006.01)
*H02G 3/30* (2006.01)

(52) U.S. Cl.
CPC ............ *F16B 5/0225* (2013.01); *H02G 3/30* (2013.01)

(58) Field of Classification Search
USPC ... 248/298.1, 346.01, 346.06, 346.07, 178.1, 248/179.1, 176.3
See application file for complete search history.

(56) References Cited

U.S. PATENT DOCUMENTS

| 4,848,858 A | * | 7/1989 | Suzuki ................ B60R 11/0217 |
| | | | 312/246 |
| 4,856,087 A | * | 8/1989 | Nesbit ...................... H04R 1/02 |
| | | | 455/344 |
| 8,613,413 B2 | | 12/2013 | Chen |
| 8,727,294 B1 | | 5/2014 | Harms |
| 9,205,875 B2 | | 12/2015 | Calisoglu et al. |
| 2010/0258697 A1 | | 10/2010 | Tseng |

(Continued)

FOREIGN PATENT DOCUMENTS

| CN | 103447840 A | 12/2013 |
| CN | 105382098 A | 3/2016 |

(Continued)

OTHER PUBLICATIONS

International Searching Authority/European Patent Office, International Search Report and Written Opinion of the International Searching Authority, Application No. PCT/EP2018/085017, dated Apr. 1, 2019, with English translation of the International Search Report, 15 pages.

(Continued)

*Primary Examiner* — Alfred J Wujciak
(74) *Attorney, Agent, or Firm* — Sunstein LLP

(57) ABSTRACT

The subject matter relates to a tolerance compensation comprising a flat part with a first recess for receiving a bolt of an attachment part and a tolerance slider with a second recess for receiving the bolt.

14 Claims, 6 Drawing Sheets

(56) References Cited

U.S. PATENT DOCUMENTS

| | | |
|---|---|---|
| 2011/0042535 A1 | 2/2011 | Cheng |
| 2012/0068027 A1 | 3/2012 | Tyner |
| 2012/0273645 A1 | 11/2012 | Chen |
| 2014/0086701 A1 | 3/2014 | Lacroix et al. |
| 2014/0183314 A1* | 7/2014 | Mulhern ............... F16M 13/00 |
| | | 248/346.06 |
| 2015/0054298 A1 | 2/2015 | Calisoglu et al. |
| 2016/0029296 A1 | 1/2016 | Bergström et al. |

FOREIGN PATENT DOCUMENTS

| | | |
|---|---|---|
| CN | 107248381 A | 10/2017 |
| DE | 10214378 C1 | 6/2003 |
| DE | 102012018947 A1 | 4/2014 |
| DE | 202013007579 U1 | 12/2014 |
| DE | 102016215033 A1 | 2/2018 |
| JP | 2003-343522 A | 12/2003 |
| TW | I409399 B | 9/2013 |
| WO | WO 2005/071271 A1 | 8/2005 |

OTHER PUBLICATIONS

International Examining Authority/European Patent Office, International Preliminary Report on Patentability, Application No. PCT/EP2018/085017, dated Mar. 3, 2020, 12 pages.

German Patent Office, Office Action, Application No. 10 2018 106 312.1, dated Oct. 31, 2018, 6 pages.

China National Intellectual Property Administration, Notification of the First Office Action, Application No. 201880091537.X, dated Jul. 5, 2021, 12 pages (English translation).

\* cited by examiner

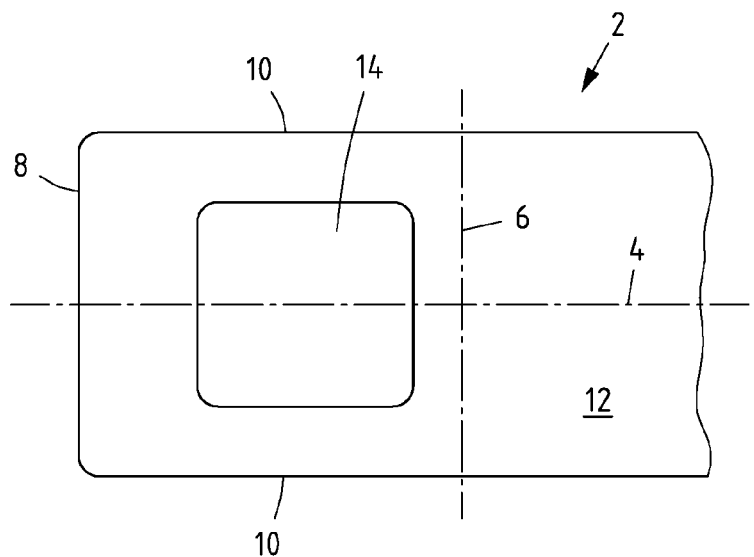
Fig.1
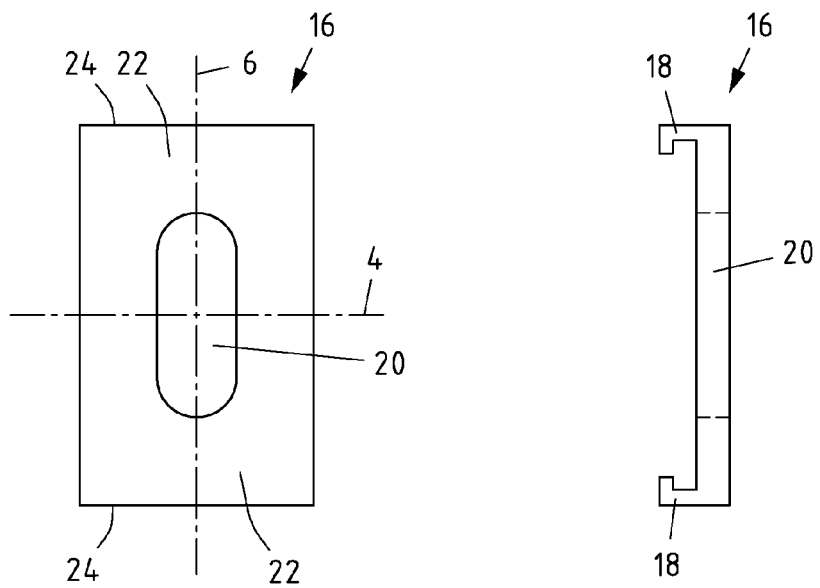
Fig.2a  Fig.2b
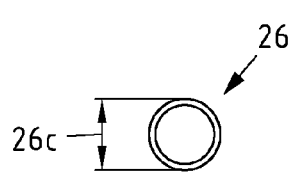 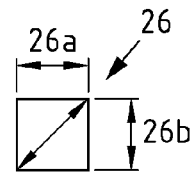
Fig.3a  Fig.3b

TOLERANCE COMPENSATION DEVICE FOR FLAT COMPONENTS

CROSS-REFERENCE TO RELATED APPLICATIONS

This application is a continuation of U.S. patent application Ser. No. 16/959,479, filed Jul. 1, 2020, which is the national phase entry of international patent application no. PCT/EP2018/085017 filed Dec. 14, 2018 and claims the benefit of German patent application No. 10 2018 106 312.1, filed Mar. 19, 2018, the disclosures of which are incorporated herein by reference in their entirety.

TECHNICAL FIELD

The subject matter relates to a tolerance compensation comprising a flat part with a first recess for receiving a bolt of an attachment part, and a tolerance slider with a second recess for receiving the bolt.

BACKGROUND ART

Connecting bolts as well as contact bolts are usually welded onto attachment parts by means of welding robots. During welding, production-related tolerances of the position of the bolt occur. If rigid flat cables are to be arranged on such bolts, these tolerances pose a problem. Since a flat cable is rigid and cannot be bent arbitrarily, it is hardly possible to compensate for tolerances, unlike with flexible cables. This is especially true if the flat parts have receiving holes for the bolts, which are only slightly larger in diameter than the diameter of the bolt.

If a bolt with the greatest possible tolerance deviation is attached to the attachment part, it may happen that the flat cable can no longer be attached to the bolt, since the bolt cannot be inserted into the recess in the flat cable. This is particularly problematic in automotive applications, where along the production line delays in the production process must be avoided as far as possible.

For this reason, the subject-matter was based on the object of optimizing the attachment of a flat part to a bolt, in particular creating the possibility of fixing a rigid flat cable to a bolt subject to tolerances in its position.

SUMMARY OF THE INVENTION

This object is solved by a tolerance compensation according to embodiments of the present invention. The preferably rigid flat part can be an integral part of a preferably rigid flat cable or be fixed as an attachment part to a flat cable. The flat part has a longitudinal extension and a transverse extension. Starting from a end face edge, the flat part extends in a longitudinal direction in a longitudinal extension (hereinafter also referred to as the Y-axis). The end face edge of the flat part extends transversely, preferably perpendicular to the longitudinal direction in a transverse direction (hereinafter also referred to as the X-axis).

The flat part has a recess for receiving a bolt of an attachment part. Such a bolt may, for example, be a welded-on fastening bolt on a motor vehicle body, on an engine, on a gearbox, on a sheet metal part or on another attachment part in a motor vehicle. A bolt can also be a contact bolt for electrically contacting the flat part and the attachment.

A tolerance slider is arranged at the flat part, which also has a recess for receiving the bolt. The tolerance slider is movably arranged on the flat part. For this purpose, the tolerance slider can be moved along the flat part, particularly along the longitudinal direction.

To receive a bolt subject to tolerances, the first recess in the flat part must be larger than the diameter of the bolt. In particular, the inside dimensions of the first recess must be larger than the largest cross-sectional extent of the bolt. Then the bolt can, even if it is mounted with tolerances deviating from its nominal position, be inserted into the first recess without the flat cable having to be bent, compressed or otherwise deformed to achieve a fit.

It is proposed that the first recess has a greater size in one direction along the longitudinal axis of the flat part than the second recess in that direction. Due to this greater size the bolt can still be inserted into the first recess if its positioning in this direction deviates. In addition, the tolerance slider can afterwards be pushed onto the bolt and the bolt can be inserted into the recess of the tolerance slide with a exact fit. Subsequently, the bolt can be attached to the tolerance slider in the usual way, e.g., by tightening a nut.

Furthermore, the first recess can have an extent in a direction transverse to the longitudinal axis of the flat part which is also larger than the diameter of the bolt. Because the recess has a greater extent than the bolt both in the direction of the longitudinal axis and in the direction transverse to the longitudinal axis, especially in the X and Y axes, a bolt with tolerances can be inserted into the first recess without further ado. To then fasten the bolt, however, the tolerance slider is provided. For this purpose, the extent of the first recess in the direction transverse to the longitudinal axis of the flat part is at least as large as the extent of the second recess in this direction. Therefore, both the tolerance slider and the flat part enable a tolerance compensation of the bolt in the direction transverse to the longitudinal axis, especially in the x-direction. Since the tolerance slider is slidably arranged on the flat part, it can be positioned at any position along the longitudinal axis over the first recess. This enables tolerance compensation in the longitudinal axis, especially in the y-direction.

To receive the bolt in the first and second recesses, the tolerance slider is arranged on the flat part in such a way that it can be slid in a direction along the longitudinal axis of the flat part over the first recess.

This design firstly makes it possible to achieve a tolerance compensation in the longitudinal axis by positioning the tolerance slider over the first recess in such a way that the first recess and the second recess are aligned with the bolt and the bolt can be inserted into the first and second recess. Since at the same time the second recess has a greater extension in the direction transverse to the longitudinal axis, in particular to the X-axis, tolerance compensation along this axis is achieved at the same time.

Finally, the bolt can be fastened to the tolerance compensation, in particular screwed, by screwing a nut or other fastening means onto the bolt and the fastening means pressing through the tolerance slider against the flat part and thus the flat part against the attachment part to which the bolt is fastened.

In the automated or semi-automated production, it is necessary that the tolerance slider can be positioned on the bolt by simple hand movements. To prevent the tolerance slider from being lost, it is proposed that the tolerance slider is positioned on the flat part so that it cannot be lost. In this way, the tolerance compensation is always ready for assembly without having to fear that a part is missing.

According to an embodiment, it is proposed that the tolerance slider is arranged on a wide surface of the flat part and grips behind one longitudinal edge of the flat part, preferably behind both longitudinal edges of the flat part. The flat part preferably has one or two end faces, two wide faces and two narrow side faces. The side faces and the wide faces are limited by the longitudinal edges. The end face is limited by the end face edges. The tolerance slider preferably grips behind the longitudinal edges of the flat part. The tolerance slider rests in a U-shaped and/or C-shaped manner on the wide surface and has lateral extensions which engage behind the longitudinal edges of the flat part.

At the side surface of the flat part, also called the narrow surface, a groove can be provided. It is proposed that the tolerance slider engages in this groove and is guided by this groove. This defines the movement of the tolerance slider along the flat part. The groove preferably extends at least according to the first recess in the longitudinal axis. Preferably, the groove can be guided into the flat part starting from the end face up until the end of the first recess facing away from the end face is reached. The groove can also extend beyond the end of the first recess.

According to an advantageous embodiment, it is proposed that the flat part is slotted from an end face edge into the first recess. The slot makes it possible to elastically compress the flat part along the X-axis in the area of the front end. This can make it easier to push the tolerance slider onto the front end of the flat part. In particular, the springing back of the flat part in the area of the front end can hold the tolerance slider in position, in particular by clamping. It is proposed that the front edge is elastically deformable by the slot. This allows the front edge to be compressed and the tolerance slider to be pushed onto the front edge by this compression. If the edge springs back afterwards, a force acting outwards onto the longitudinal edges can clamp the tolerance slider.

The tolerance slider can not only grip on the outside of the flat part, but it can also be guided on the inner surfaces of the first recess. For this reason, it is proposed that the tolerance slider is guided in the first recess. In particular, the tolerance slider can be guided in a groove arranged on an inner edge of the recess. It is also possible that the tolerance slider encompasses an inner edge of the recess. Because the tolerance slider is guided in the recess, the tolerance compensation can be realized in a particularly small height. This can be particularly advantageous when installation space is limited.

The first recess is preferably rectangular or square and the second recess is preferably an oblong hole. The second recess preferably has an extent in y-direction which corresponds approximately to the diameter of the bolt. On the other hand, the extent in the x-direction can be greater than the diameter of the bolt, so that tolerance compensation in the x-direction is possible with the tolerance slider.

According to an advantageous embodiment, it is proposed that the direction transverse to the longitudinal axis of the flat part is perpendicular to the longitudinal axis of the flat part. x- and y-direction or x- and y-axis are thus perpendicular to each other.

According to an embodiment, it is proposed that the recess has an extension in the direction along the longitudinal axis of the flat part and in the direction transverse to the longitudinal axis, which corresponds at least to a tolerance of the position of the bolt on the attachment part.

According to an embodiment it is proposed that the tolerance slider is held to the bolt in a clamped manner. After the first and the second recess have been placed on the bolt, the bolt can be fixed to the tolerance compensation, for example by screwing it on.

It is also possible that the tolerance slider is made of a metal or a plastic material. It is also possible that the flat part is made of metal or a plastic.

A flat cable can extend along an underbody or along a centre console in a vehicle, for example. In particular, it may extend from the engine compartment to the boot. Other routings of the flat cables are also possible. These long flat cables usually have taps which are electrically attached to bolts. Such taps can be realized in particular by so-called connection boxes, which are fixed to the flat conductor. At the connection boxes, the electrical connections and, if necessary, fused taps from the flat cable can be provided. On the output side of the connection boxes, connection lugs can be provided which are formed according to a tolerance compensation described above. Thus, a flat cable can be laid in the vehicle and the fixing and/or electrical contacting of the flat cable can be carried out via the tolerance compensation. The longitudinal extension of the tolerance compensation can be transverse, preferably perpendicular to the longitudinal extension of the flat cable. It is also possible that the flat part itself is a flat cable. By means of the connection boxes, a number of taps can be realized along a flat cable, which at the same time can also represent mechanical fixings of the flat cable. It is also conceivable that only mechanical fixations of the flat cable can be realized by appropriate tolerance compensations.

A further aspect is a system with tolerance compensation as described above and an attachment part, whereby a flat part with tolerance compensation is attached to a bolt arranged on the attachment part, whereby the bolt is attached to the add-on part with tolerances and is guided through the first and second recess.

BRIEF DESCRIPTION OF THE DRAWINGS

In the following, the object is explained in more detail by means of a drawing showing embodiments. In the drawing show:

FIG. 1 view of a flat part;

FIG. 2a, b views of a tolerance slider;

FIG. 3a, b top views of a bolt;

DETAILED DESCRIPTION OF SPECIFIC EMBODIMENTS

Figure 4A:
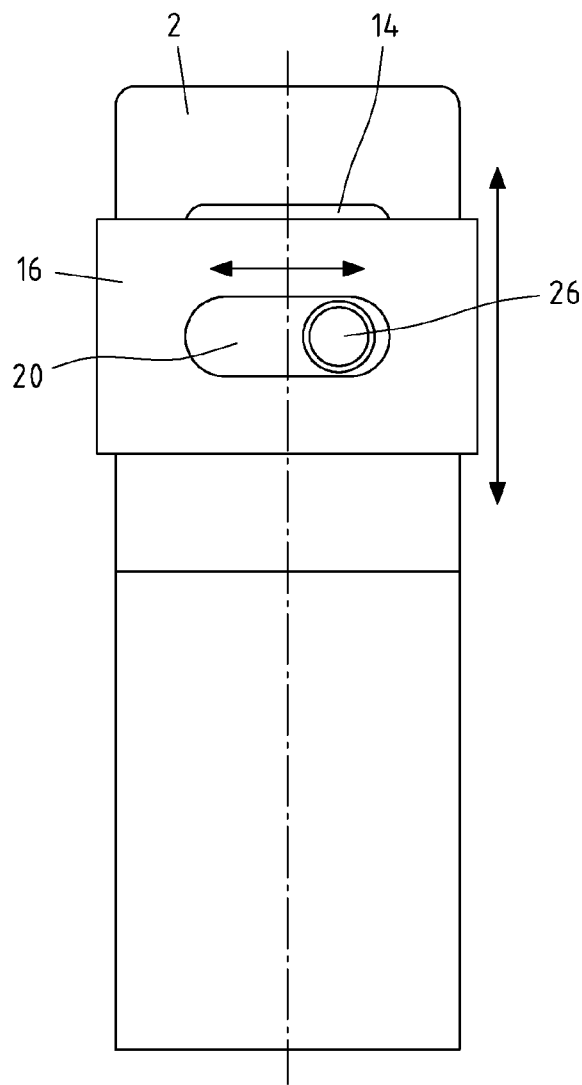
FIG. 4a, b a tolerance compensation according to an embodiment.

FIG. 1 shows a flat part 2, which has a longitudinal extent along a Y-axis 4 and a transverse extension along an X-axis 6. The end face edges 8 run parallel to the X-axis 6. The longitudinal edges 10 run parallel to the Y-axis. A first recess 14 is provided in the wide surface 12 of the flat part.

The recess 14 can be formed as a oblong hole. The extent of recess 14 along the Y-axis 4 is preferably greater than the extent of recess 14 along the X-axis 6. The dimensions of recess 14 are such that the extents in the directions of X-axis 6 and Y-axis 4 are greater than the maximum tolerances of a bolt on an attachment part.

A tolerance slider 16 as shown in FIG. 2a, b can be slid onto the flat part 2 as shown in FIG. 1. A top view of a tolerance slider 16 is shown in FIG. 2a. The tolerance slider 16 has an extent along the X-axis 6 which is either slightly larger than the extent of the flat part 2 along the X-axis 6 or corresponds to the extent of the recess 14 along the X-axis 6. In the first case, the tolerance slider 16 can be provided with outer arms 18, as shown in FIG. 2b, which can embrace the flat part 2 along the longitudinal edges 10. In the latter case it is possible that the tolerance slider 16 is inserted into the recess 14. Both will be shown below.

A recess 20 is provided in the tolerance slider 16. The recess 20 preferably has the same extent along the X-axis 6 as the recess 14, but can also be reduced by the dimension of the webs 22, which limit the recess 20 in the direction of the longitudinal edges 24.

In the y-direction 4, recess 20 has a smaller extent than recess 14. In particular, the extent of recess 20 in the direction of the y-axis 4 is preferably only slightly larger than a diameter of a bolt.

The arms 18 can be c-shaped in order to e.g., completely embrace the flat part 2 along the longitudinal edges 10 and, if necessary, to grip behind it or to engage in a groove arranged on a side surface.

Bolts, to which a tolerance compensation according to the subject-matter is to be attached, can have different shapes. FIGS. 3a and b show examples of such different shapes. For example, a bolt 26 can have a diameter 26c. This is shown in FIG. 3a.

FIG. 3b shows that a bolt 26 can also have a rectangular or square cross-section. Other polygonal cross-sections are also possible. The longitudinal extent 26a and the transverse extension 26b can, for example, be decisive for the size of recess 14 and 20. In particular, recess 14 in Y axis 4 is larger than the transverse extent 26a. The recess 14 is larger along the X-axis 6 than the transverse extent 26b. The recess 22 preferably is, along the Y-axis 4, as large as or only slightly larger than the longitudinal extension 26a. The recess 20 is preferably larger along the X-axis 6 than the transverse extension 26b.

To attach the flat part 2 to a bolt 26, it is placed on a bolt 26 as shown in FIGS. 4-8.

FIGS. 4a, b show a fastening of a flat part 2 to a bolt 26, where the bolt 26 has a deviation from its target position in the image plane to the right and downwards.

The tolerance slider 16 can be moved along the Y-axis 4 on the flat part 2. The displacement direction 28 corresponds to the orientation of the Y-axis 4. To fix the flat part 2 to the bolt 26, the recess 14 is placed over the bolt 26 and the bolt 26 is pushed through the recess 14. At the same time, the tolerance slider 16 is positioned along the displacement direction 28 on the flat part 2 in such a way that the bolt 26 can also be inserted through the recess 20. It can be seen that the bolt 26 is received by the tolerance slider 16 in such a way that the recess 20 touches the bolt 26 in close contact, especially along the Y-axis 4. Thus, the bolt 26 can for example be screwed to the flat part 2 by means of a screw connection.

Figure 4B:
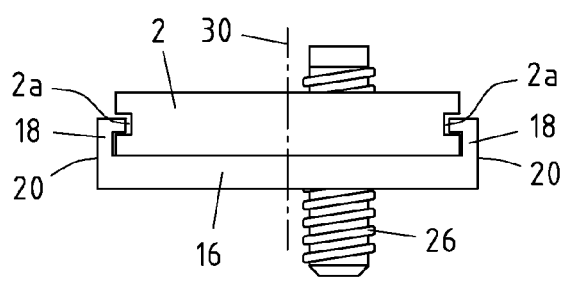

In FIG. 4b it can be seen that the bolt 26 is displaced from the target position 30 to the right. Furthermore it can be seen that the tolerance slider 16 engages with its arms 18 in a groove 2a of the flat part 2 on the side faces of the flat part 2.

Figure 5A:
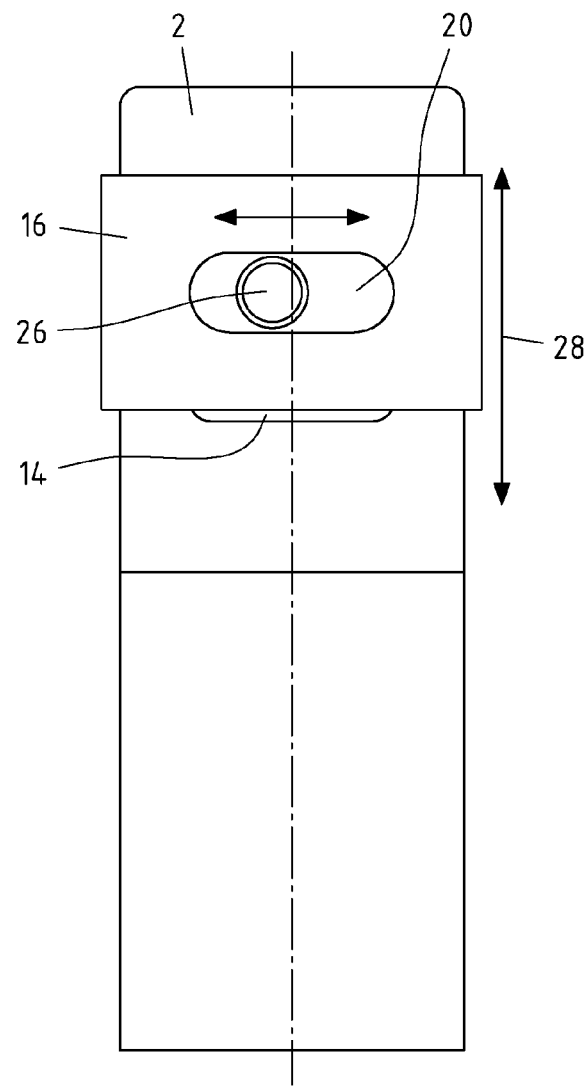
FIG. 5a, b a tolerance compensation according to an embodiment.

FIG. 5a shows a further embodiment in which the bolt 26 is shifted to the left and upwards in relation to the target position 30. Here too, the extent of recess 14 ensures that the bolt 26 can be inserted into recess 14 without any problems. The flat part 2 can remain in the target position 30, although the bolt 26 has a tolerance in relation to it. By shifting the tolerance slider 16 along the shifting direction 28, the bolt 26 can be positioned in the recess 20.

Figure 5B:
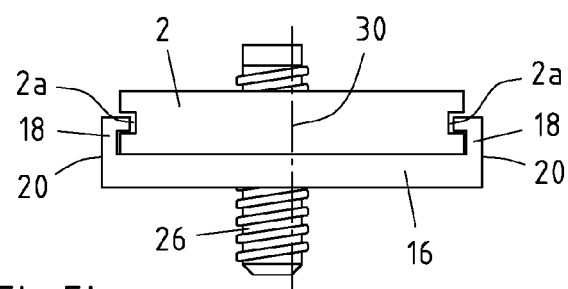

FIG. 5b also shows a positioning of the bolt 26 deviating from a target position 30.

Figure 6:
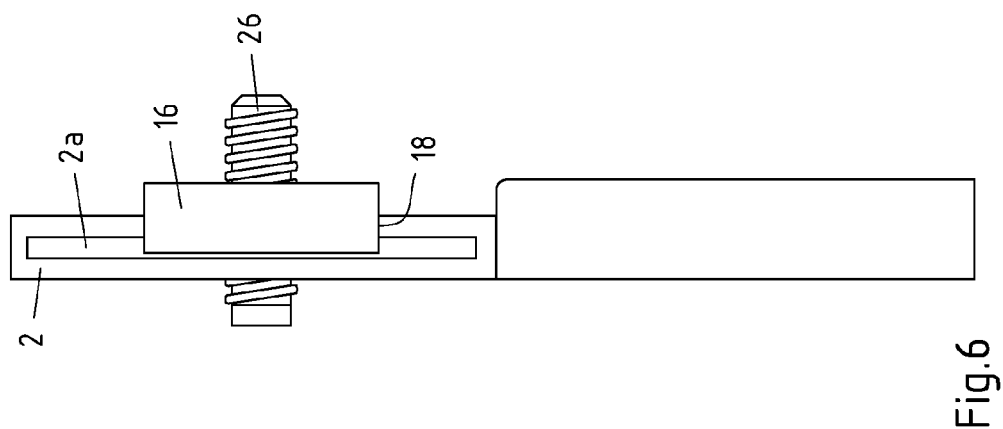
FIG. 6 a side view of a tolerance slider according to an embodiment.

FIG. 6 shows a side view of a tolerance compensation according to FIG. 5a. It can be seen how the arms 18 engage in the groove 2a. The groove 2a extends along the recess 14.

Figure 7A:
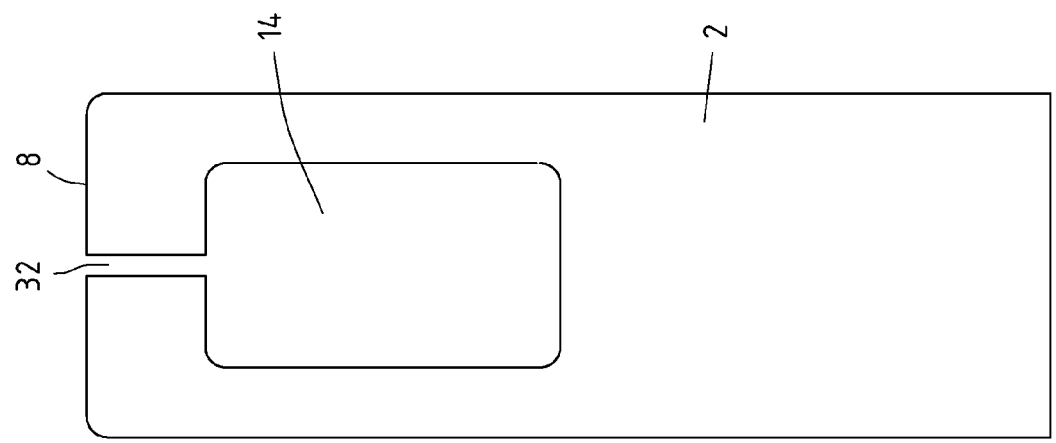
FIG. 7a-c a tolerance compensation according to an embodiment.

FIG. 7a shows a flat part 2, which has a slot 32 in the area of the front face edge 8. The slot 32 extends from the front face edge 8 to the recess 14. Due to the slot 32 it is possible to elastically deform the flat part 12 in the area of the recess 14 in the direction of the X-axis 6. This can be particularly advantageous if the tolerance slider 16 is to be pushed onto the flat part 2.

Figure 7B:
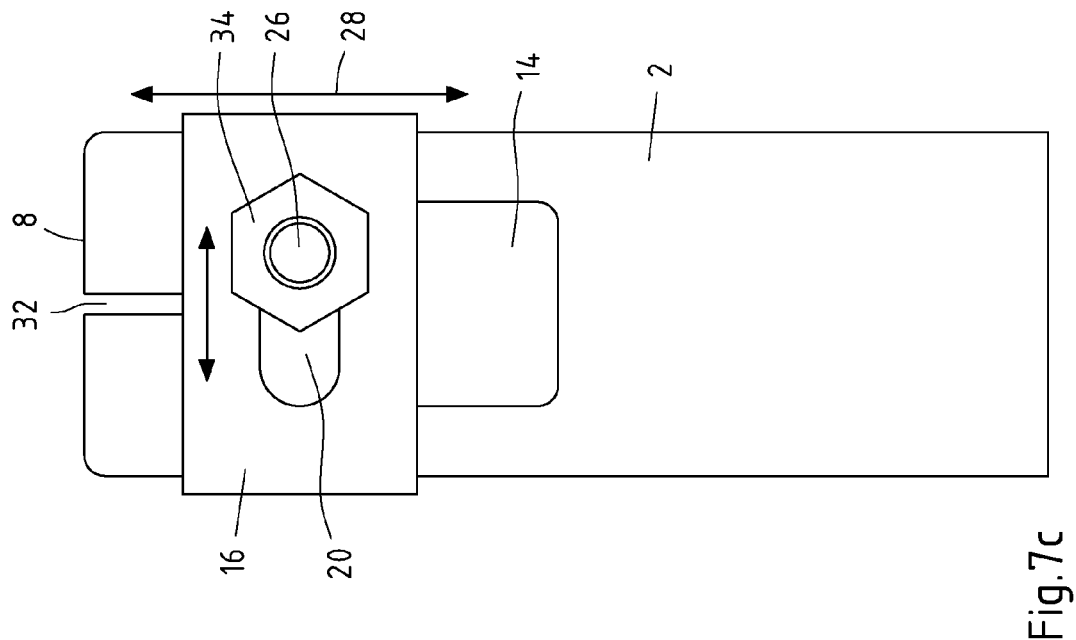

In FIG. 7b it can be seen that the tolerance slider 16 has been pushed onto the flat part 2. Here, for example, the slot 32 can serve to compress the front face edge 8 so that the tolerance slider 6, which embraces the flat part 2 with its arms 18, can be pushed onto the flat part 2. The slot 32 is then widened again by the restoring force of the flat part 2, so that the tolerance slider 16 can be held at the flat part 2, for example in a clamped manner. The positioning of the bolt 26 in the recesses 14, 20 according to FIG. 7b is carried out as shown in FIG. 4a.

Figure 7C:
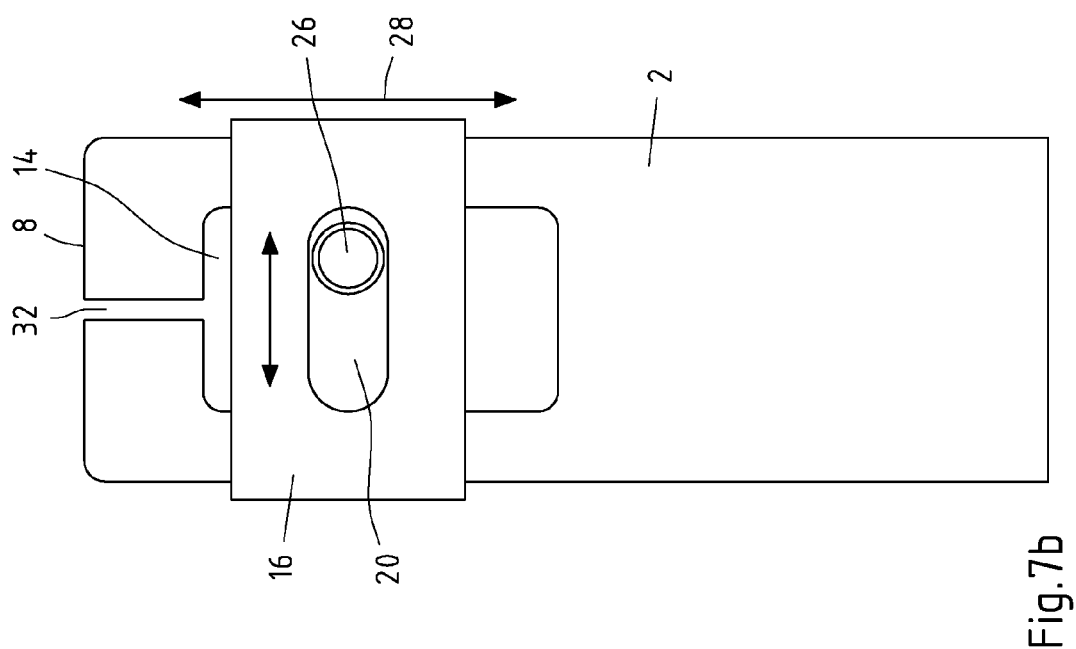

Subsequently, a fixing of the bolt 26 follows, as shown in FIG. 7c. For this purpose, a nut 34, for example, is screwed onto the bolt 26. Via a washer not shown, the nut 34 can be pressed onto the tolerance slider 16. This fixes the flat part 2 and the tolerance slider 16 to the bolt 26 and to the attachment part to which the bolt 26 is attached.

Figure 8:
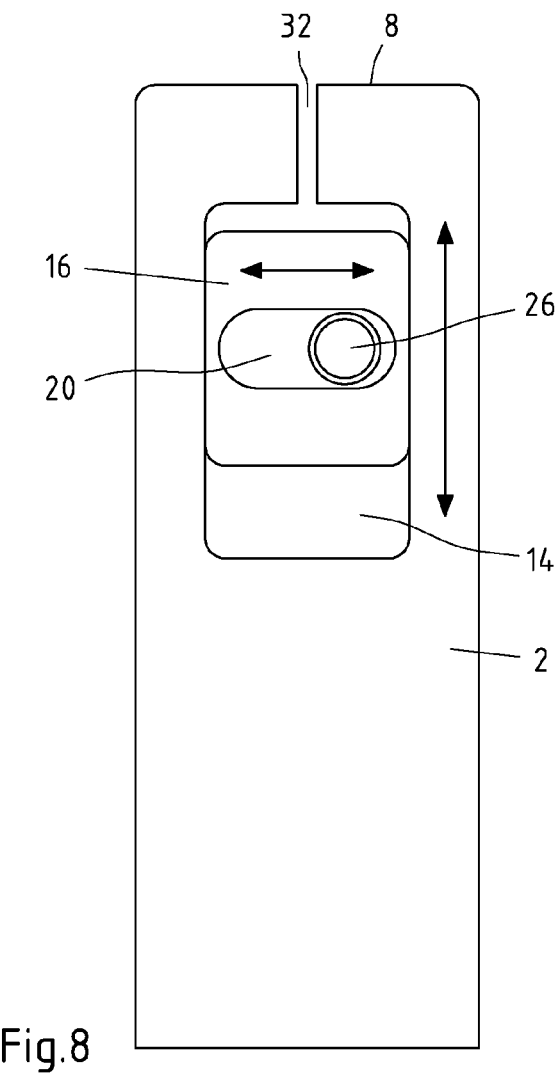
FIG. 8 a tolerance compensation according to an embodiment.

FIG. 8 shows a further embodiment in which the tolerance slider 16 is guided in the recess 14. It can be seen that the tolerance slider 16 is guided with its longitudinal edges 24 on the inside longitudinal edges of recess 14. For this purpose, the tolerance slider 16 can engage in grooves within the inner surfaces of recess 14, for example. The tolerance slider 16 can also embrace the longitudinal edges of recess 14. A positioning of the bolt 26 in the recesses 14, 20 is carried out in such a way that the tolerance slider 16 is shifted in shift direction 28 in the recess 14 so that it is aligned with the bolt 26. Then the bolt 26 can be pushed through the recess 20 and thus through the recess 14 and can be fixed, for example, with a nut, as shown in FIG. 7c, to the tolerance slide 16.

Figure 9:
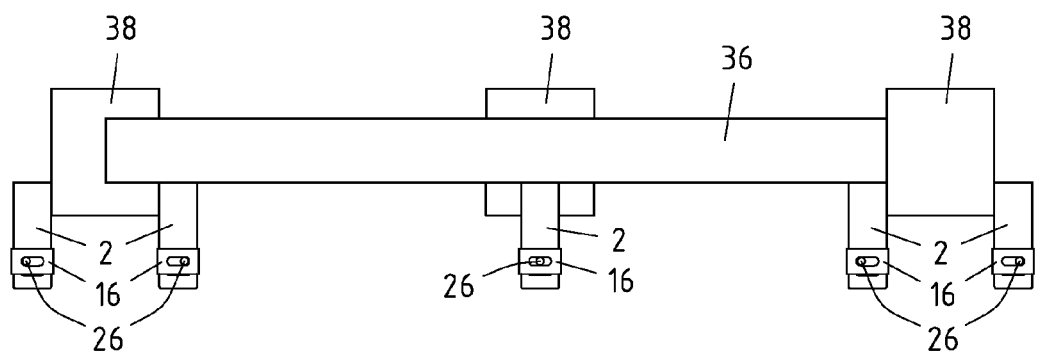
FIG. 9 shows an arrangement of tolerance compensations on a multilayer flat conductor.

FIG. 9 shows a further embodiment in which a flat cable 36 is assembled. The flat cable 36 can, for example, be designed as a double flat cable and be made up of flat parts lying one above the other. The double flat cable can be connected with the battery positive pole on the one hand and the battery negative pole on the other hand. Taps can be provided at different positions along the flat cable 36. Thus, two or more taps are possible. These taps can, for example, be welded onto the flat cable 36 and protected by means of coupling boxes 38.

The flat cable 36 can be bent around different axes, especially around the longitudinal axis of the flat cable 36 and/or the transverse axis of the flat cable 36 and/or an axis perpendicular to the drawing plane.

The Coupling Boxes 38 can be provided for fastening with coarse threaded bolts 26. For this purpose, tolerance compensations with flat part 2 and tolerance slider 16 are provided on the coupling boxes 38. One or more tolerance compensations can be provided at a coupling box 38.

The bolts 26 are welded to the body subject to tolerances. In order to avoid that the flat cable 36 has to be bent when fixing it, the tolerance compensations according to the subject-matter are provided. At each of the tolerance compensations, a tolerance of a bolt 26 can be compensated by moving the tolerance slide 16 along the flat part 2. Thus, the flat cable 36 or the coupling boxes 38 can be attached to the bolts 26 without mechanical tensions occurring on the coupling boxes 38, the bolts 26 and the taps arranged in the coupling boxes 38.

To fix the bolts 26 to the tolerance sliders, plastic nuts can be provided, for example, which can be tightened with a few Newton metres of slots.

For example, two taps, one at a lower flat cable and one at an upper flat cable, can be provided at a coupling box 38, so that the double flat cable 36 can be tapped at its two potentials.

LIST OF REFERENCE SIGNS

2 Flat part
4 Y-axis
6 X-axis
8 End face edge
10 Longitudinal edge
12 Wide surface
14 Recess
16 Tolerance slider
18 Arms
20 Recess
22 Webs
24 Longitudinal edge
26 Bolt
26a Longitudinal extent
26b Lateral extent
26c Diameter
28 Shifting direction
30 Target position
32 Slot
34 Nut
36 Flat cable

What is claimed is:

1. System with a tolerance compensation in a vehicle, comprising:
    a flat part having a first recess for receiving a bolt of vehicle of an attachment part and having an end face edge; and
    a tolerance slider with a second recess for receiving the bolt of vehicle;
    wherein the flat part has a longitudinal axis extending from the end face edge in longitudinal direction and a transversal axis extending transversally to the longitudinal axis,
    wherein the first recess has a greater extent in a direction along the longitudinal axis of the flat part than the second recess in that direction, and wherein the first recess has an extent in the direction along the longitudinal axis of the flat part which is greater than a diameter of the bolt, and wherein the extent of first recess in the direction along the longitudinal axis is defined by side walls at either end of the recess,
    the first recess has an extent in a direction along the transversal axis which is greater than the diameter of the bolt and which corresponds at least to the extent of the second recess in this direction, and
    wherein the second recess is an oblong hole with an extent in the direction along the transversal axis of the flat part which is greater than the diameter of the bolt,
    the tolerance slider for receiving the bolt in the first and second recesses is arranged on the flat part in such a way that it can be displaced in directions along the longitudinal axis and transversal axis of the flat part over the first recess, and
    the system further comprising:
    a vehicle flat cable with at least one tolerance compensation being welded to the cable, and arranged for being fixed to the bolt of vehicle.

2. System of claim 1, wherein the tolerance slider is arranged on the flat part so that it cannot be lost.

3. System of claim 1, wherein the tolerance slider is arranged on a wide surface of the flat part and grips behind a longitudinal edge of the flat part.

4. System of claim 3 wherein the tolerance slider grips behind both longitudinal edges of the flat part.

5. System of claim 1, wherein the tolerance slider is guided in a groove arranged on a side surface of the flat part.

6. System of claim 5, wherein the tolerance slider engages in the groove.

7. System of claim 1, wherein the tolerance slider is guided in the first recess.

8. System of claim 7, wherein the tolerance slider is guided in a groove arranged at an inner edge of the first recess or that the tolerance slider embraces an inner edge of the recess.

9. System of claim 1, wherein the first recess is rectangular or square.

10. System of claim 1, wherein the transverse axis of the flat part is perpendicular to the longitudinal axis of the flat part.

11. System of claim 1, wherein the first recess has an extent in the direction along the longitudinal axis and the transversal axis of the flat part which corresponds at least to a tolerance of the position of the bolt on the attachment part.

12. System of claim 1, wherein the tolerance slider is made of a metal or a plastic.

13. System of claim 1, wherein the flat part is slotted from the end face edge into the first recess and the end face edge is elastically deformable due to the slot, so that the tolerance slider can be pushed onto the end face edge by compression of the end face edge.

14. System of claim 1, wherein the tolerance slider is held in a clamping manner at the bolt.

* * * * *